UNITED STATES PATENT OFFICE.

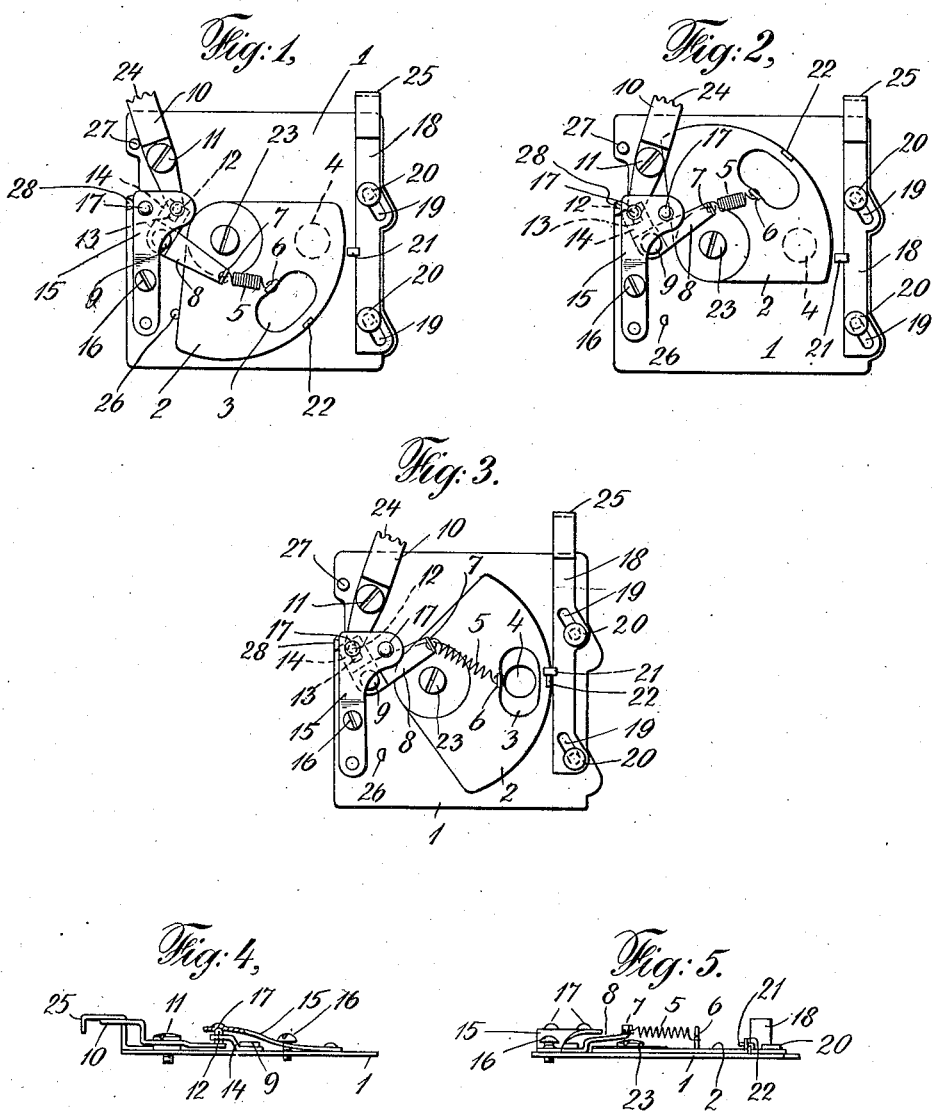

CARL BORNMANN, OF BINGHAMTON, NEW YORK, ASSIGNOR TO ANSCO COMPANY, OF BINGHAMTON, NEW YORK.

PHOTOGRAPHIC SHUTTER.

1,033,524.   Specification of Letters Patent.   Patented July 23, 1912.

Application filed January 12, 1912. Serial No. 670,915.

*To all whom it may concern:*

Be it known that I, CARL BORNMANN, a citizen of the United States, and a resident of the city of Binghamton, county of Broome, State of New York, have invented certain new and useful Improvements in Photographic Shutters, of which the following is a full, clear, and exact description.

This invention is an improvement upon that patented to me by United States Letters Patent No. 745,272 dated November 24, 1903 and it embodies many of the features found therein, combined, however, with certain additional features, whereby the shutter is adapted to small cameras, requiring shutter mechanism of comparatively limited size.

Referring to the drawings, Figure 1 illustrates a front view of the shutter embodying the invention, showing the parts in one of the positions they occupy ready for an exposure; Fig. 2 illustrates a like view of the same parts in the position they occupy after an exposure has been made and in which they are also ready for another exposure which will, however, be made in the reverse direction. Fig. 3 illustrates a like view of the parts in the position they occupy during a time exposure; Fig. 4 illustrates an edgewise view, partly in section, of that which is shown in Fig. 1, the shutter being omitted to avoid confusion in this figure; Fig. 5 illustrates an edgewise view of that which is shown in Fig. 3.

In the drawings, 1 represents the base plate for the shutter, 2 the shutter wing, 3 the exposure opening therein, 4 the exposure opening in the base plate, 5 the actuating spring for the shutter connected at one end to a stud 6, or equivalent point of attachment on the shutter wing, and at its other end to a suitable point of attachment 7, on a small bellcrank lever 8 which is pivoted at 9 to the base plate 1. 10 is another lever pivoted at 11 to the base plate, which engages by means of a pin 12, or equivalent connection, in a slot 13 made in the other member 14 of the bellcrank lever.

15 is a spring plate fastened in any suitable manner, as by a screw 16, to the base plate. It has two indentations, or sockets, 17, 17, made in it, in which the end of the pin 12 can enter and be held. This device also exerts slight pressure upon the bellcrank lever 8 and the auxiliary lever 10, pressing them gently against the base plate, whereby good, smooth movements of the parts are secured in a manner well understood.

18 is what I call the time stop bar. It is provided with two slots 19, 19, in which engage pins 20, 20, and with a stop 21 which engages with a similar stop 22 made on the edge of the shutter, when the bar is in its projected position. The shutter wing is pivoted at 23.

24 is the exposed end of the actuating lever 10, preferably roughened as shown. 25 is the exposed end of the time stop bar 18. It will be noted that both of these extremities 24 and 25 project beyond the same side of the shutter mechanism. This is a convenience, since they are both clearly in sight when one or the other is to be manipulated.

26 is a stop which limits the downward movement of the shutter wing, its upward movement being limited by engagement with the pivot 11 of the lever 10, as shown in Fig. 2.

27 is a stop which limits the outward movement of the lever 10.

28 is a stop which limits its inward movement.

The operation is as follows: The parts being in the position shown in Fig. 1, it will be seen that the wing of the shutter covers the exposure opening 4 in the base plate 1 and also that the pin 12 on the inner end of the lever 10 rests in the right hand indentation 17 in the spring plate 15, consequently the bellcrank lever 8 is in such position that the spring 5 occupies a position below the axis of the shutter wing, in other words, below the pivot 23 and also that the time stop bar 18 is in its retracted position, so that its stop 21 lies out of the path of the stop 22 on the shutter wing. Now to make an instantaneous exposure, the operator with the thumb or finger pushes the exposed end 24 of the lever 10, which is accessible from the outside of the camera, toward the opposite end of the slot through which it works in the opposite direction from that which it is at that time, in so doing, in a manner well understood, the bellcrank lever 8 will be carried in the opposite direction, in other words, into the position shown in Fig. 2, and in so doing the spring 5 will be carried upwardly and shifted across the line of support of the shutter wing 2, in other words, above the pivot 23, and as the spring passes that pivot, its tension will move the shutter from the position shown in Fig. 1 into that shown in Fig. 2, and during the transit of the exposure opening 3 in the shutter wing past the exposure opening 4 in the base plate, the exposure will be made, and at this time also the pin 12 on the lever 10 will have entered the opposite depression 17 in the spring plate 15, so that the parts will now be held in the position shown in Fig. 2, just as they were formerly held in the position shown in Fig. 1, so that jars, shocks, or other disturbing influences will not result in a false exposure.

To make a time exposure, the lever 18 is pulled upwardly from the position shown in Figs. 1 and 2 into that shown in Fig. 3, and by so doing, through the action of the pins 20 in the slots 19, the bar 18 will move in a parallel direction inwardly toward the wing of the shutter, so that the stop 21 upon the bar will lie in the path of the stop 22 upon the shutter wing. If it now be attempted to make an exposure, these two stops engaging with each other will arrest the transit of the shutter wing over the exposure opening 4 in the base plate, so that the opening 3 in the wing will register with the opening 4 in the base plate, and remain there during the time of exposure and until the bar 18 is again manipulated, so as to remove its stop from the path of the stop 22, whereupon the shutter will complete its transit. Instead of operating the bar 18 to terminate the time exposure, the lever 10 may of course be appropriately operated to return the shutter wing to its primary position, instead of completing its swing.

In Fig. 3 I illustrate the positions of the parts during the time of exposure, as above explained, except that the exposure is in this instance supposed to be made when the shutter wing is moving from its lower position into the upper position as shown in Fig. 1, instead of in the reverse direction.

It will be obvious to those who are familiar with this art that changes may be made in the details of construction shown and described without departing from the essentials of the invention.

I claim:

1. In a photographic shutter, the combination of a pivoted shutter wing, a pivoted bellcrank lever, an auxiliary pivoted lever, one end of which engages with one end of the bellcrank lever, the other end of which auxiliary lever is adapted to be manipulated from the outside of the camera, a spring connecting the bellcrank lever with the shutter wing, stops to limit the movement of the wing, other stops to limit the movement of the levers and a time stop adapted to be moved into and out of engagement with the shutter and to be manipulated from the same side of the camera as that at which the operating end of the auxiliary lever is manipulated.

2. In a photographic shutter, the combination of a pivoted shutter wing, a pivoted bellcrank lever, an auxiliary pivoted lever, one end of which engages with one end of the bellcrank lever, the other end of which auxiliary lever is adapted to be manipulated from the outside of the camera, a spring retaining device adapted to engage with the levers and retain them in predetermined positions, a spring connecting the bellcrank lever with the shutter wing, and stops to limit the movement of the wing.

3. In a photographic shutter, the combination of a pivoted shutter wing, a pivoted bellcrank lever, an auxiliary pivoted lever, one end of which engages with one end of the bellcrank lever, the other end of which auxiliary lever is adapted to be manipulated from the outside of the camera, a combined friction and retaining device adapted to impose friction upon certain of the moving parts and to retain them in predetermined positions, a spring connecting the bellcrank lever with the shutter wing, and stops to limit the movement of the wing.

In testimony whereof I have signed my name to this specification in the presence of two subscribing witnesses.

CARL BORNMANN.

Witnesses:
GEO. W. TOPLIFF,
H. P. MOXON.